(12) United States Patent
Li (10) Patent No.: US 10,722,035 B2
(45) Date of Patent: Jul. 28, 2020

(54) RATTAN WEAVING STRUCTURE, RATTAN CHAIR MADE WITH THE STRUCTURE AND A METHOD FOR FORMING A CONVEX KNOT THEREOF

(71) Applicant: Hongguang Li, Jinhua (CN)

(72) Inventor: Hongguang Li, Jinhua (CN)

(73) Assignee: Hongguang Li, Jinhua, Zhejiang Province (CN)

( * ) Notice: Subject to any disclaimer, the term of this patent is extended or adjusted under 35 U.S.C. 154(b) by 0 days.

(21) Appl. No.: 15/520,843

(22) PCT Filed: Mar. 4, 2017

(86) PCT No.: PCT/CN2017/075669
§ 371 (c)(1),
(2) Date: Apr. 20, 2017

(87) PCT Pub. No.: WO2017/177774
PCT Pub. Date: Oct. 19, 2017

(65) Prior Publication Data
US 2019/0029431 A1    Jan. 31, 2019

(30) Foreign Application Priority Data

Apr. 15, 2016  (CN) .......................... 2016 1 0239481
Apr. 15, 2016  (CN) .......................... 2016 1 0242248

(51) Int. Cl.
*A47C 5/02*     (2006.01)
*A47C 5/00*     (2006.01)
(Continued)

(52) U.S. Cl.
CPC ............... *A47C 5/02* (2013.01); *A47C 5/00* (2013.01); *A47C 5/06* (2013.01); *A47C 5/12* (2013.01);
(Continued)

(58) Field of Classification Search
CPC ............... B29C 66/137; B29C 53/54; B29C 2045/14909; B29C 2045/14204;
(Continued)

(56) References Cited

U.S. PATENT DOCUMENTS 2,423,246 A * 7/1947 Martin ................ B29C 57/00
                                                      29/505
4,188,983 A * 2/1980 Graham ................ A47G 7/08
                                                     139/424

(Continued)

*Primary Examiner* — Jacob T Minskey
*Assistant Examiner* — Cedrick S Williams
(74) *Attorney, Agent, or Firm* — Cheng-Ju Chiang (57) ABSTRACT

The present invention discloses a plastic rattan weaving structure, a rattan chair made with the structure and a method for forming a convex knot. The convex knot has a cross section that is greater than the middle cross section of the rattan piece used for making the rattan weaving structure. The rattan weaving structure has the convex knots on its edge. The rattan chair has a chair seat, a skeleton, an armrest and a base. The chair seat has the convex knots on its edge. The method for forming the convex knot comprises pressing and fixing the edge of the plastic rattan piece with a mold, setting up heating elements around the edge, heating the edge of the plastic rattan with the heating elements to cause shrinkage and accumulation of the rattan inside the mold, and finally formation of the convex knot.

4 Claims, 8 Drawing Sheets

(51) Int. Cl.
| | |
|---|---|
| *A47C 7/00* | (2006.01) |
| *A47C 5/06* | (2006.01) |
| *A47C 7/02* | (2006.01) |
| *A47C 5/12* | (2006.01) |
| *A47C 7/22* | (2006.01) |
| *A47C 7/46* | (2006.01) |
| *B29C 43/02* | (2006.01) |
| *B29C 43/52* | (2006.01) |
| *D03D 25/00* | (2006.01) |
| *B29K 23/00* | (2006.01) |
| *B29L 31/00* | (2006.01) |

(52) U.S. Cl.
CPC ............... *A47C 7/00* (2013.01); *A47C 7/029* (2018.08); *A47C 7/22* (2013.01); *A47C 7/46* (2013.01); *B29C 43/021* (2013.01); *B29C 43/52* (2013.01); *D03D 25/00* (2013.01); *B29K 2023/0683* (2013.01); *B29L 2031/771* (2013.01); *D03D 2700/0174* (2013.01); *D03D 2700/0196* (2013.01)

(58) Field of Classification Search
CPC . B29C 65/245; B29C 65/02; B29C 2043/522; B29C 2043/525; B29C 51/00; A47C 5/02; A47C 5/00; A47C 5/12; A47C 5/06
USPC .......................................... 264/249, 296, 320
See application file for complete search history.

(56) References Cited

U.S. PATENT DOCUMENTS

| | | |
|---|---|---|
| 5,769,500 A | 6/1998 | Holbrook |
| 8,550,565 B2 | 10/2013 | Caldwell |
| 9,868,238 B1* | 1/2018 | Scopton .................. B29C 45/78 |
| 2007/0018495 A1* | 1/2007 | Xiang ...................... A47C 5/02 297/452.59 |

* cited by examiner

RATTAN WEAVING STRUCTURE, RATTAN CHAIR MADE WITH THE STRUCTURE AND A METHOD FOR FORMING A CONVEX KNOT THEREOF

CROSS-REFERENCE TO RELATED APPLICATION

This application is a continuation application of International Patent Application No. PCT/CN2017/075669, filed Mar. 4, 2017, which itself claims priority to and benefit of, under 35 U.S.C. § 119(a), Patent Application Nos. 201610242248.8 and 201610239481.0, both filed on Apr. 15, 2016 in the State Intellectual Property Office of P. R. China, which are incorporated herein by reference in their entireties.

FIELD OF THE INVENTION

The present invention pertains to manufacture of rattan products, especially to a machine-processed rattan weaving structure, a rattan chair made with the structure and a method for forming a convex knot of plastic rattan.

BACKGROUND OF THE INVENTION

Currently existing rattan products, such as rattan chairs, are usually hand-weaved, in which workers must have certain rattan weaving skills, and individual weaving skill levels also have a great impact on product quality. In the meantime, hand-weaving also requires much time and efforts so that the production cost is very high. At present, machine weaving can only weave flat rattan structures, and there is no better solution in the industry to effectively make rattan products from flat rattan structures. The major reason is that for a machine weaving rattan structure, its edge can hardly be secured to a skeleton of an existing table, chair or other furniture. If a hand-weaving method is applied, it would be very labor-intensive and high in cost; if a sewing method is applied, strength would be much lower than that of a typical hand-weaved rattan structure, and once a suture is broken, the structure of the entire rattan product could also break.

Furthermore, rattan products on the market are mostly manufactured by using plastic rattan, mainly because of the high cost of natural rattan, influences by its production seasons and limited quantity. In order to increase weaving speed and reduce labor consumption, a machine flat weaving technology is introduced to the rattan weaving industry. In order to install and secure rattan products made by flat weaving, convex knots must be made at the edge of the rattan weaving products. The convex knots are then embedded into an internal cavity of the skeleton of an existing table, chair or other furniture to complete the installation and fixation process.

Plastic rattan is made from a material of ultra-high molecular weight polyethylene (UHMWPE). This material is of poor heat resistance (heat distortion temperature), poor formability, and thus it is not suitable for direct contact with high temperature, which may cause deformation, carbonization and nigrescence, as well as fragile in texture. If the convex knots are made by hand-weaving, the production process would be time-consuming and costly.

SUMMARY OF THE INVENTION

Comparing to the existing machine-produced flat rattan structure, the present invention provides a rattan weaving structure which is easy in installation and fixation.

Aiming to the existing needs for making convex knots using plastic rattan, the present invention provides a method for forming a convex knot of plastic rattan. Such method provides high efficiency and high strength to the produced convex knots without carbonization and nigrescence.

The technical solution of the present invention is carried out via the following manners.

A rattan weaving structure, comprises convex knots at the edges of the rattan weaving structure, that is to say, there is one convex knot at each of the two ends of a rattan piece (or rattan strip). Each of the convex knots has a cross section greater than the middle cross section of the rattan piece. In order to fix the rattan weaving structure into place, a skeleton structure is designed. The skeleton structure is a tube, which has an internal cavity. The internal cavity connects with the external through a narrow channel (or slit). The narrow channel is slightly wider than the middle cross section of the rattan piece and narrower than the cross section of the convex knot. The rattan weaving structure passes through the narrow channel so that the convex knot is fixed inside the internal cavity of the skeleton structure, therefore the rattan weaving structure is installed and fixed onto the skeleton structure. This method of installation and fixing is simple and with high strength. Even when a rattan piece or a convex knot is broken, the whole structure would not be affected. Furthermore, the rattan weaving structure does not require strictly that the skeleton structure to be straight, therefore installation and fixing could be done even when the skeleton structure is bent.

In the above-mentioned rattan weaving structure, the rattan piece can be replaced by plastic rattan since natural rattan has always been in short supply. The use of plastic rattan instead of natural rattan increases the supply of raw material and reduces cost, therefore the production is not influenced by seasonal effects of natrual rattan supply.

A rattan chair, comprises a chair seat, a skeleton, an armrest and a base. The chair seat is woven from rattan pieces (or rattan strips). There are convex knots located at the edges of the chair seat, that is to say, there is one convex knot at each of the two ends of a rattan piece. Each of the convex knots has a cross section that is greater than a middle cross section of the rattan piece. The skeleton of the rattan chair is a tube, the tube has an internal cavity. The internal cavity connects with the external through a narrow channel (or slit). The narrow channel is slightly wider than the middle cross section of the rattan piece and narrower than the cross section of the convex knot. The edges of the chair seat passes through the narrow channel so that the convex knot is secured inside the internal cavity of the skeleton. The armrest and the base are also secured on the skeleton.

In the rattan chair, the skeleton of the rattan chair comprises a side frame and a top frame, each of the frames passes through the chair seat and bends back towards the chair seat so that they can push open the chair seat, and each frame is secured by a pair of fixing members. The side frame can be designed into a shape in accordance to a human ergonomic curve to improve comfort of the rattan chair.

In the rattan chair, the pair of fixing members is a first fixing member and a second fixing member. There are bumps and grooves on the first and second fixing members. The fixing members are located at the two ends of each of the side frame and the top frame. When the side frame and the top frame are bending back towards the chair seat, the first fixing member and the second fixing member are brought together, and the bumps of each of the fixing members are embedded into the grooves of the corresponding fixing members. In order to obtain a more secured fixation, the first fixing member and the second fixing member are designed to have skeleton fixing holes and fixing-member fixing holes. The fixing members and the skeleton are secured together by using a bolt to pass through the skeleton fixing holes. The first fixing member and the second fixing member are secured together by using a bolt to pass through the fixing-member fixing holes.

A method for forming the convex knot, comprises the following steps: pressing and fixing the edges of the plastic rattan with a mold, setting a plurality of heating elements around the edge, heating the edge of the plastic rattan with the heating elements to cause shrinkage, accumulation of the plastic rattan on the mold, and final formation of the convex knot. Since the heating elements do not have direct contact with the plastic rattan piece, during the heating process, the edge of the plastic rattan piece is heated up slowly, and the edge starts to shrink when its temperature just reaches deformation temperature. When the shrinkage begins, the distance between the edge of the plastic rattan piece and the heating elements increases, the rate of temperature increase slows down. After a certain period of time, the entire edge of the plastic rattan piece shrinks and accumulates on the inside of the mold, forming a convex knot.

In the method for forming the convex knot, the mold has a mold cavity, and the convex knot is molded in the mold cavity when the edge of the plastic rattan is heated for shrinkage. By this method, the shape of the produced convex knot can be controlled to keep the same size, which is important for future installation and fixation.

In the method for forming the convex knot, the initial distance between the heating elements and the edge of the plastic rattan is in a range of 3-8 cm. The heating elements is heated to a temperature in a range of 130-180° C. Depending on the different heating temperatures of the heating elements and the different initial distances between the heating elements and the edge of the plastic rattan, the rate of shrinkage of the plastic rattan can vary. It is shown that when the heating elements are at a temperature of 150° C., and when the initial distance between the heating elements and the edge of the plastic rattan is 5 cm, the rate of formation of a convex knot is less than 10 seconds. This provides better production efficiency, and the produced convex knot is both beautiful on the appearance and high in strength.

In FIG. 1 to FIG. 8, 1 represents a chair seat; 1a represents a rattan piece; 1b represents a convex knot; 2 represents a skeleton; 2a represents a side frame; 2b represents a top frame; 2c represents an internal cavity; 2d represents a narrow channel (or slit); 3 represents an armrest; 4 represents a base; 5a represents a first fixing member; 5b represents a second fixing member; 5c represents a place slot; 5d represents a skeleton fixing hole; 5e represents a fixing-member fixing hole; 5f represents a bump; 5g represents a groove; 6 represents a mold; 6a represents a mold cavity; 7 represents a heating element.

DETAILED DESCRIPTION OF THE INVENTION

By referring to the drawings, the present invention is further illustrated with the following embodiments.

Figure 1:
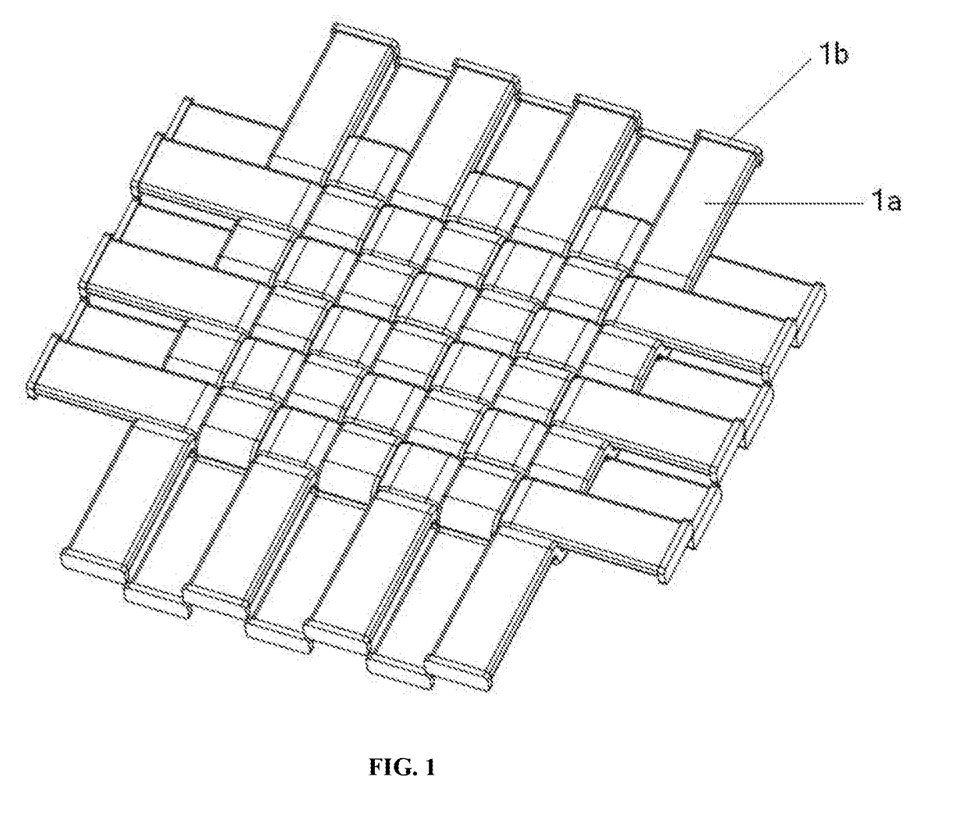
FIG. 1 shows a schematic diagram of the rattan weaving structure of the present invention.
Figure 2:
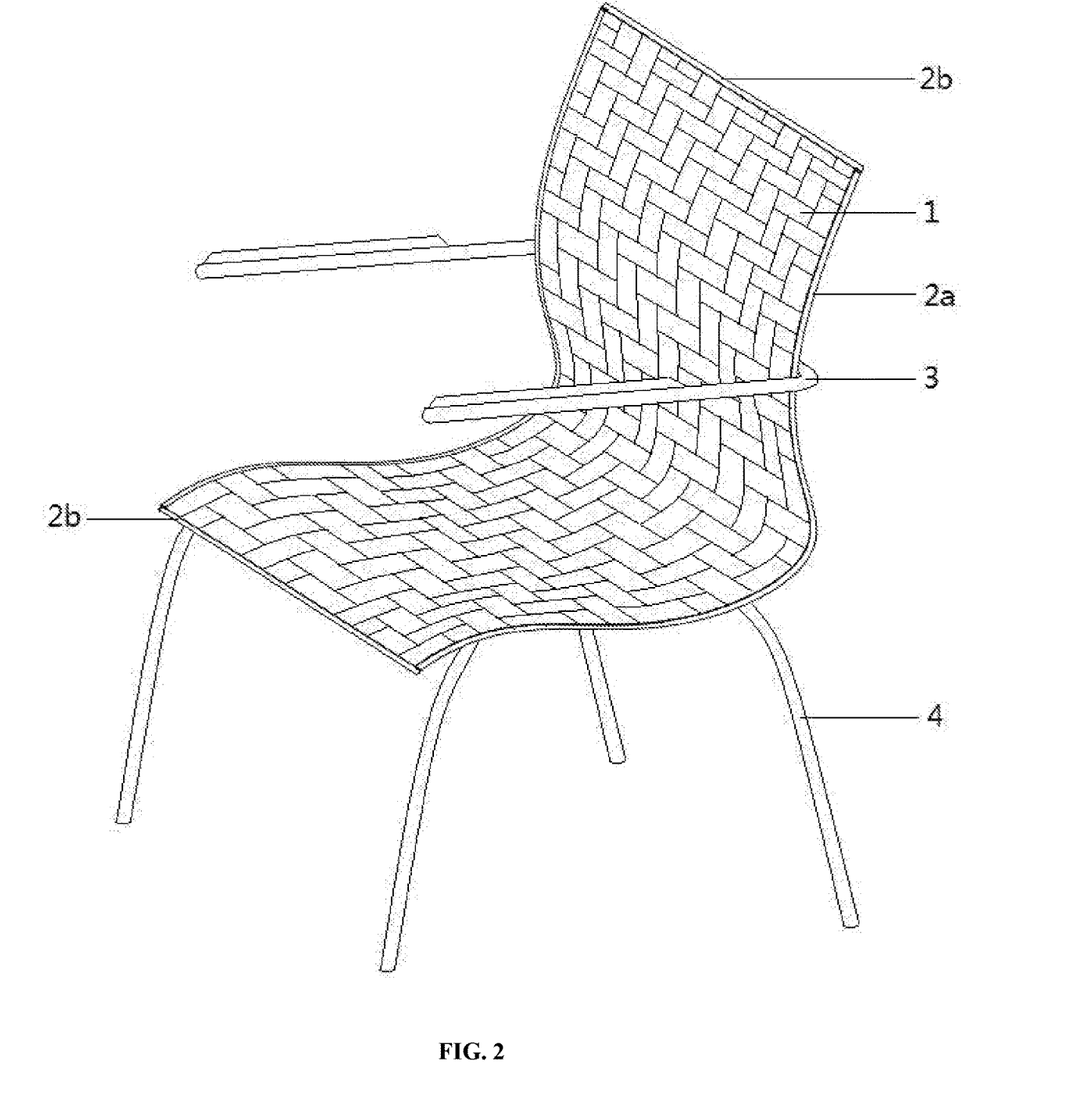
FIG. 2 shows a schematic diagram of the rattan chair of the present invention.
Figure 3:
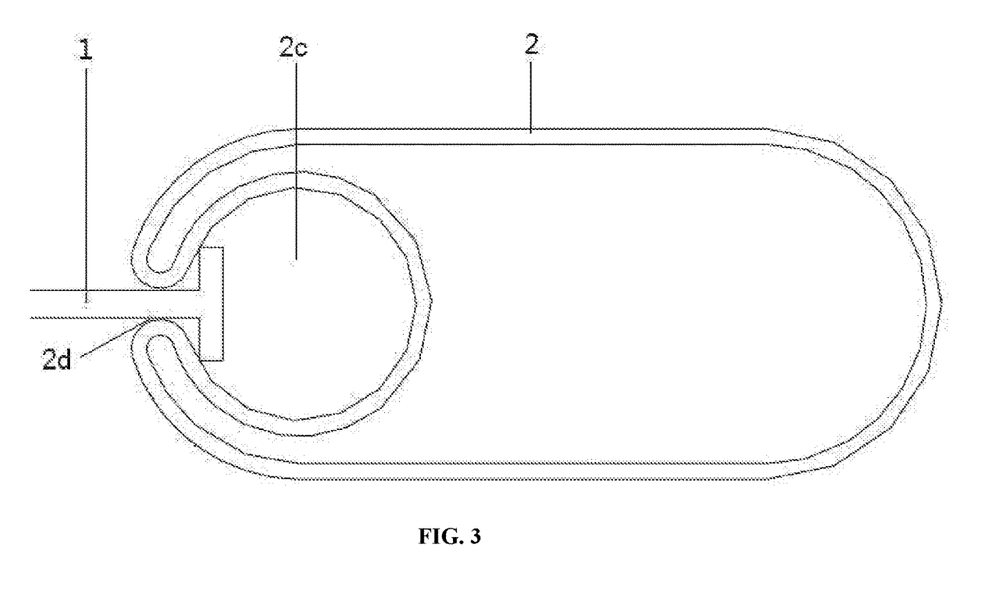
FIG. 3 shows a schematic diagram of the rattan weaving structure and the skeleton.
Figure 4:
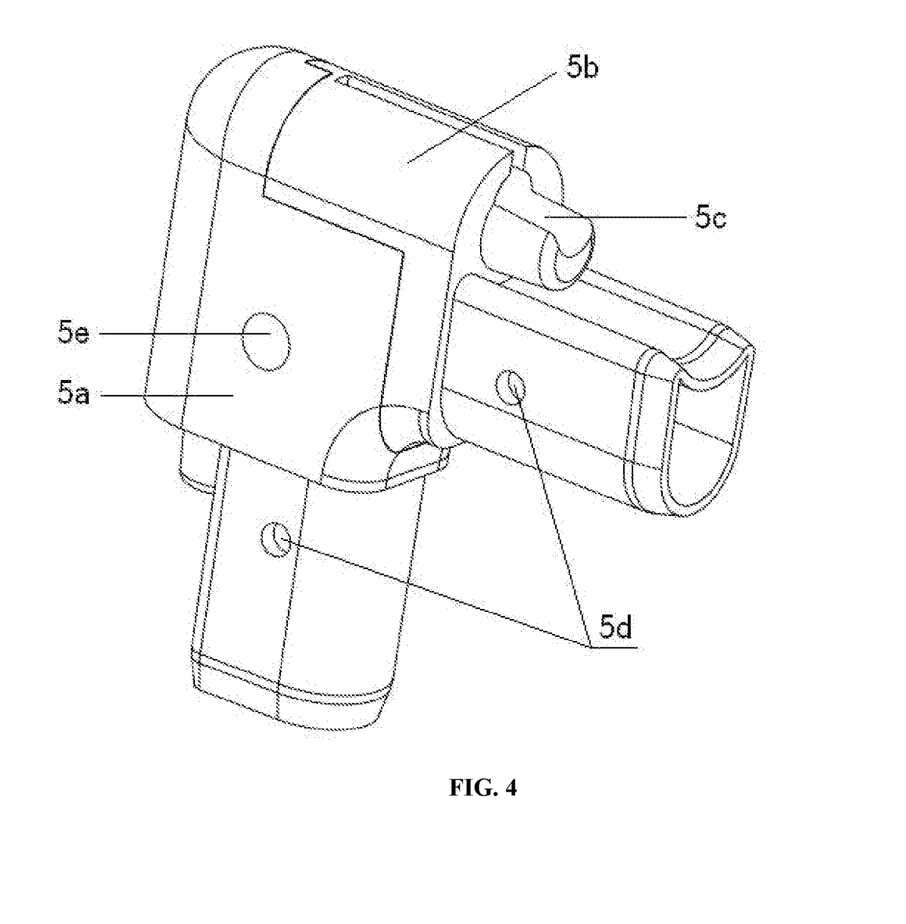
FIG. 4 shows a schematic diagram of a pair of fixing members.
Figure 5:
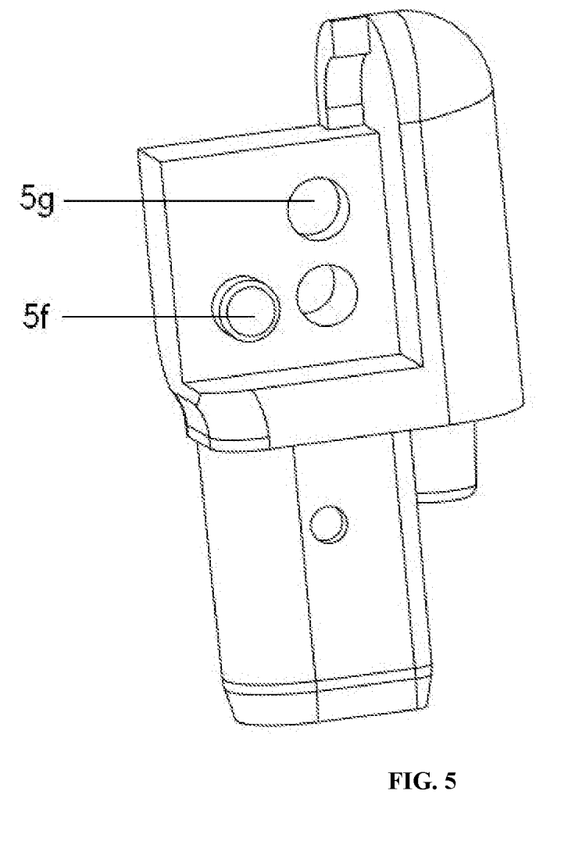
FIG. 5 shows a schematic diagram of a first fixing member.
Figure 6:
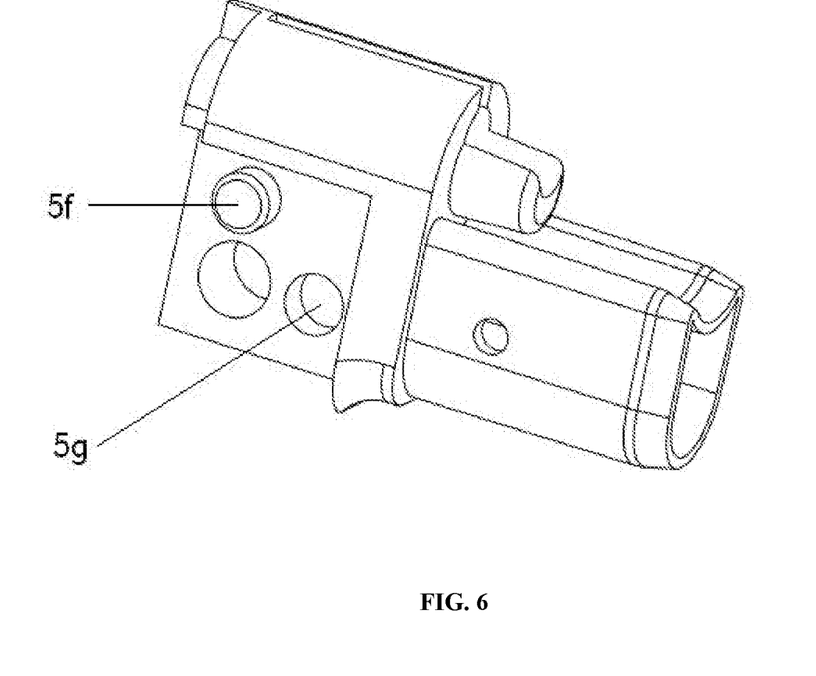
FIG. 6 shows a schematic diagram of a second fixing member.

As shown in FIG. 1, a rattan weaving structure is woven using a plurality of rattan pieces 1a (or rattan strips), and has convex knots 1b at the edges of the rattan weaving structure, that is to say, there is one convex knot 1b at each of the two ends of each rattan piece 1a. The convex knot 1b has a cross section that is greater than a middle cross section of the rattan piece 1a, where the middle or middle portion of each rattan piece 1a is defined as the structure between the two convex knots of that rattan piece 1a. The rattan pieces 1a used in the rattan weaving structure are plastic rattans. In certain embodiments, when viewing the cross section of the rattan pieces, the width and the thickness of the convex knots 1b are respectively greater than the width and the thickness of the middle portions of the rattan pieces 1a.

As shown in FIGS. 2-6, a rattan chair comprises a chair seat 1, a skeleton 2, an armrest 3 and a base 4. The chair seat 1 is woven from rattan pieces 1a. The convex knots 1b are located at the edges of the chair seat 1, that is to say, there is one convex knot 1b at each of the two ends of a rattan piece 1a. The convex knot 1b has a cross section that is greater than a middle cross section of the rattan piece 1a. In other words, each of the rattan pieces 1a has a middle portion and two convex knots 1b located at two ends of the middle portion of that rattan piece 1a. In certain embodiments, each rattan piece 1a may have a shape of a strip, and has a length, a width and a thickness. The thickness of the convex knots 1b is greater than the thickness of the middle portion of the rattan piece 1a. In certain embodiments, when viewing the cross section, the width of the convex knots 1b is also greater than the width of the middle portion of the rattan piece 1a. The skeleton 2 of the rattan chair is a tube. The tube has an internal cavity 2c. The internal cavity 2c connects the external through a narrow channel (or slit) 2d along a length direction of the tube. The narrow channel (or slit) 2d is slightly wider than the thickness of the middle cross section of the rattan piece 1a (i.e., the thickness of the middle portion) and narrower than the thickness of the cross section of the convex knots 1b, so that the woven rattan can be inserted into the cavity from an end of the tube, where the convex knots 1b is slid into the tube, and the middle portions of the woven rattan pieces is connected with the convex knots 1b through the narrow channel (or slit) 2d. The chair seat 1 passes through the slit 2d so that the convex knots 1b are secured inside the internal cavity 2c of the skeleton 2. The armrest 3 and the base 4 are also secured on the skeleton 2. The skeleton 2 of the rattan chair comprises a side frame 2a and a top frame 2b. The side frame 2a has a shape, which is in accordance to the human ergonomic curve. Each of the side frame 2a and the top frame 2b has the corresponding edges (or sides) of the chair seat 1 passed through, and then bends backwards so that the chair seat 1 is pushed open (surface of the chair seat tightened), and each frame is secured by a first fixing member 5a and a second fixing member 5b to another frame. There are bumps 5f and grooves 5g on the first fixing member 5a and the second fixing member 5b. The first fixing member 5a and the second fixing member 5b are located at each of the two ends of the side frame 2a and the top frame 2b, that is to say, located at a connection corner formed by one end of the side frame 2a and the corresponding end of the top frame 2b. When the side frame 2a and the top frame 2b are bent backwards, the first fixing member 5a and the second fixing member 5b are brought together, and the bumps 5f of each of the fixing members 5a and 5b are embedded into the grooves 5g of the corresponding fixing members 5a and 5b. Each of the first fixing member 5a and the second fixing member 5b has a skeleton fixing hole 5d and a fixing-member fixing hole 5e. Each of the first fixing member 5a and the second fixing member 5b are secured together with the skeleton 2 by using a bolt to pass through the skeleton fixing hole 5d. The first fixing member 5a and the second fixing member 5b are secured together by using a bolt to pass through the fixing-member fixing hole 5e. Each of the first fixing member and the second fixing member further comprises a place slot 5c, which is used to connect with the chair seat 1. The first fixing member 5a and the second fixing member 5b are thus located at corners where the top frame 2b and the side frame 2a are connected.

Figure 7:
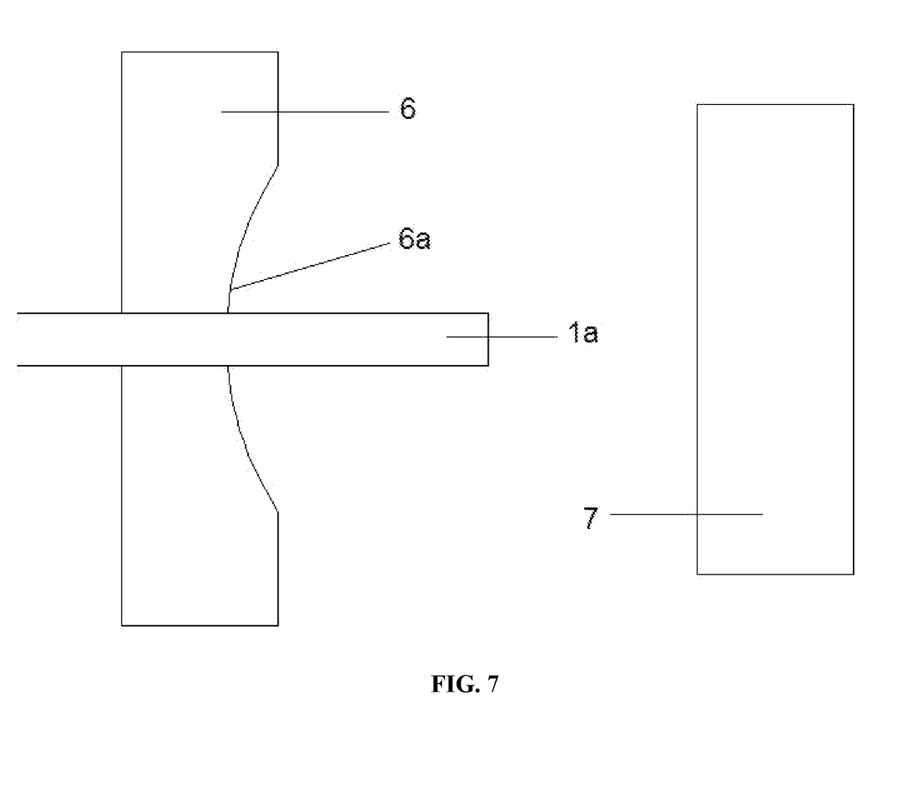
FIG. 7 shows a state diagram before the formation of the convex knot.
Figure 8:
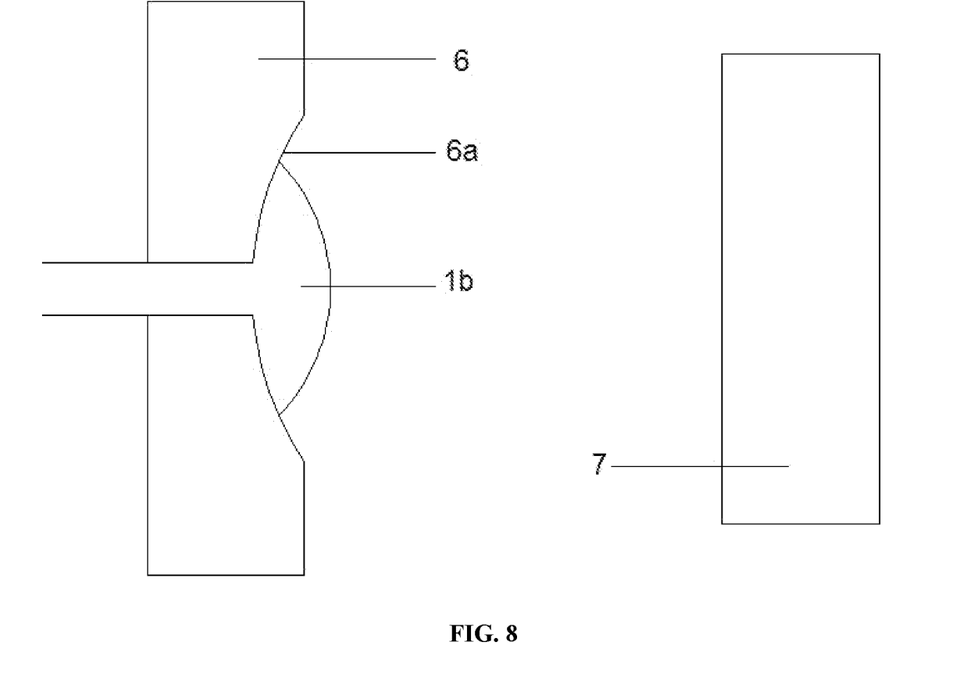
FIG. 8 shows a state diagram after the formation of the convex knot.

As shown in FIGS. 7-8, in one embodiment of the present invention, the method for forming the convex knot comprises the following steps: the edge of the plastic rattan piece 1a is pressed and secured with a mold 6, a heating element 7 is set around the edges of the plastic rattan piece 1a, the heating element 7 has a stable heating temperature of about 150° C., and the initial distance between the heating element 7 and the edge of the plastic rattan piece 1a is 5 cm. The edge of the plastic rattan piece 1a is heated with the heating element 7 via thermal radiation to cause shrinkage and accumulation of the rattan in the mold cavity 6a, and the convex knot 1b is formed after about 10 seconds. People skilled in the art would understand that there could be a variety of variants of the mold cavity 6a and thus the corresponding convex knot 1b would have a variety of variants.

Experiments showed that when the heating elements 7 have a stable heating temperature of about 130° C., and when the initial distance between the heating elements 7 and the edges of the plastic rattan piece 1a are 3 cm, the plastic rattan 1a shows a relatively slower shrinkage speed, and the convex knot forms after about 20 seconds. When the heating elements 7 have a stable heating temperature of about 180° C., and when the initial distance between the heating elements 7 and the edges of the plastic rattan piece 1a is 8 cm, the plastic rattan 1a shows a relatively faster shrinkage speed, and the convex knot forms after about seven seconds, but the produced convex knot 1b has a strength slightly lower than the strength of the rattan piece itself.

What is claimed is:

1. A method for forming a convex knot, wherein the method comprises:
   fixing an edge of a rattan piece with a mold which has a mold cavity to expose the edge of the rattan piece in the mold cavity; the rattan piece is a plastic rattan piece;
   setting a heating element kept spaced from the edge of the plastic rattan piece exposed in the mold cavity;
   heating the edge of the rattan piece with the heating element spaced from the edge of the rattan piece via thermal radiation to cause self shrinkage of rattan at the edge of the rattan piece;
   accumulating the shrunk rattan in the mold cavity of the mold; and
   forming a convex knot by the accumulated rattan at the edge of the rattan piece;
   the convex knot is provided at an edge of a rattan weaving structure, both of two ends of each plastic rattan piece are provided with convex knots, the rattan weaving structure is made by a plurality of first plastic rattan pieces extending in a longitudinal direction of the rattan weaving structure and a plurality of second plastic rattan pieces extending in a transverse direction of the rattan weaving structure, and the convex knot has a cross section greater than a middle cross section of the plastic rattan pieces.

2. The method for forming the convex knot according to claim 1, wherein an initial distance between the heating element and the edge of the rattan piece is in a range of 3-8 cm.

3. The method for forming the convex knot according to claim 1, wherein the heating element has a heating temperature of 130-180° C.

4. The method for forming the convex knot according to claim 1, wherein the heating element and the edge of the rattan have an initial distance of 5 cm, and the heating element has a heating temperature of 150° C.

* * * * *